United States Patent
Ho et al.

(10) Patent No.: US 9,626,558 B2
(45) Date of Patent: Apr. 18, 2017

(54) ENVIRONMENTAL REPRODUCTION SYSTEM FOR REPRESENTING AN ENVIRONMENT USING ONE OR MORE ENVIRONMENTAL SENSORS

(71) Applicant: Google Inc., Mountain View, CA (US)

(72) Inventors: Casey Kwok Ching Ho, Burnaby (CA); Sharvil A. Nanavati, Dundas (CA)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 14/568,943

(22) Filed: Dec. 12, 2014

(65) Prior Publication Data

US 2015/0178562 A1 Jun. 25, 2015

Related U.S. Application Data

(63) Continuation of application No. 12/976,027, filed on Dec. 22, 2010, now Pat. No. 8,922,645.

(51) Int. Cl.
*H04N 7/18* (2006.01)
*G09B 9/00* (2006.01)
(Continued)

(52) U.S. Cl.
CPC ....... *G06K 9/00476* (2013.01); *G06K 9/4604* (2013.01); *G06T 5/00* (2013.01);
(Continued)

(58) Field of Classification Search
None
See application file for complete search history.

(56) References Cited

U.S. PATENT DOCUMENTS 5,303,051 A 4/1994 Levesque
7,714,895 B2 5/2010 Pretlove
(Continued)

FOREIGN PATENT DOCUMENTS

EP 1498832 A1 1/2005

OTHER PUBLICATIONS

Office Action issued in U.S. Appl. No. 12/976,027 on Jul. 3, 2013, 10 pages.
(Continued)

*Primary Examiner* — Geepy Pe
(74) *Attorney, Agent, or Firm* — Fish & Richardson P.C.

(57) ABSTRACT

A environmental reproduction system multiplexes information from a variety of sources to reproduce a target environment having visual and/or auditory impediments. The visual impediments may include one or more environmental conditions, such as rain, sleet, snow, darkness, brightness, or any other type of environmental condition. The auditory impediments may include loud noises, such as construction noises, or sounds that are too low, such as an emergency vehicle sound not being heard. The environmental reproduction system may determine the environmental condition from one or more sources, such as an internal microphone, an external microphone, temperature sensor, a camera, a weather receiver, or other types of sensors. The environmental reproduction may be in communication with an environmental condition database and operative to apply a signal processing action to a recording (video and/or audio recording) of the target environment based on the determined environmental condition.

16 Claims, 5 Drawing Sheets

(51) Int. Cl.
*G06K 9/00* (2006.01)
*G06T 5/00* (2006.01)
*G06T 5/50* (2006.01)
*G09B 21/00* (2006.01)
*G06K 9/46* (2006.01)
*G06T 11/60* (2006.01)

(52) U.S. Cl.
CPC ............... *G06T 5/001* (2013.01); *G06T 5/50* (2013.01); *G06T 11/60* (2013.01); *G09B 21/00* (2013.01); *G09B 21/006* (2013.01); *G09B 21/008* (2013.01); *G09B 21/009* (2013.01); *H04N 7/18* (2013.01); *G06T 2207/10016* (2013.01); *G06T 2207/20221* (2013.01); *H04M 2250/12* (2013.01)

(56) References Cited

U.S. PATENT DOCUMENTS

| | | |
|---|---|---|
| 7,783,183 B2 | 8/2010 | Garg |
| 7,949,522 B2 | 5/2011 | Hetherington |
| 8,184,827 B2 | 5/2012 | Yoshizawa |
| 8,194,993 B1 | 6/2012 | Chen |

OTHER PUBLICATIONS

Office Action issued in U.S. Appl. No. 12/976,027 on Oct. 18, 2013, 11 pages.
Office Action issued in U.S. Appl. No. 12/976,027 on May 7, 2014, 11 pages.
Notice of Allowance issued in U.S. Appl. No. 12/976,027 on Aug. 22, 2014, 8 pages.

ENVIRONMENTAL REPRODUCTION SYSTEM FOR REPRESENTING AN ENVIRONMENT USING ONE OR MORE ENVIRONMENTAL SENSORS

CROSS-REFERENCE TO RELATED APPLICATION

This application is a continuation of U.S. application Ser. No. 12/976,027 filed on Dec. 22, 2010, the contents of which are incorporated herein in their entirety.

BACKGROUND

Human senses, such as sight and sound, are frequently impeded by many natural and artificial causes. For instance, the setting of the sun, the outbreak of a heavy thunderstorm, darkness, and recurrent building or road construction may all interfere with sight. High winds, loud music, or construction noises may interfere with hearing. In each of these scenarios, the causes that impede the sense of sight or sense of sound are distractions that inhibit a person's ability to focus his or her senses for a particular task. For example, impediments to sight may affect a person's ability to find an address on a building and impediments to sound may affect a person's ability to recognize when there is an approaching emergency vehicle.

While there are general solutions for overcoming some of the impediments to sight, such as sonar, radar, infrared, etc., these general solutions often require the use of specialized equipment that may be expensive or hard to find. Moreover, these general solutions often may not faithfully reconstruct the environment and often provide a visual representation of the environment that lacks detail or may be artificially colored. Similarly, while there are general solutions to overcoming the impediments to sound, such as using noise canceling headphones or increasing the audio of a radio or electronic digital player, these methods may present incomplete solutions for recreating the surroundings. The general solutions for overcoming sound interference often aim to muffle or overpower other sources of sound, and thus attempt to become the only source of sound. At loud volumes, these solutions may also become impractical.

BRIEF SUMMARY

A system for representing an environment is disclosed. In one embodiment, the system includes a memory comprising a location database operative to store geographic location information about an environment and an environmental condition database comprising one or more environmental condition records correlating environmental conditions with environmental actions.

The system may also include a processor in communication with the memory. The processor may be operative to receive environmental information from an environmental input device, receive one or more environmental measurements from an environmental sensor, retrieve the environmental action from the a selected one of the environmental condition records based on a given one of the environmental measurements, and combine the geographic location information from the location database with the environmental information from the environmental input device.

In another embodiment of the system, the environmental input device comprises a camera operative to record a video, and the environmental information comprises a video of the environment recorded by the camera.

In a further embodiment of the system, the processor is further operative to combine the video of the environment recorded by the camera with the geographic location information from the location database.

In yet another embodiment of the system, the environmental input device comprises an internal microphone operative to record a first sound and an external microphone operative to record a second sound, the environmental sensor comprises a sound level meter operative to detect a sound level of the first sound and a sound level of the second sound, and the processor is further operative to adjust the sound level of the first sound based on the first and second sound levels.

In yet a further embodiment of the system, the processor is further operative to adjust the sound level of the second sound based on the level of sound detected by the environment sensor to obtain a third sound comprising the second sound having the adjusted sound level, combine the first sound recorded by the internal microphone with the third sound obtained by the processor, and transmit the combined first sound and third sound to an output device.

In another embodiment of the system, the environmental information comprises a recorded video of the environment, the processor is further operative to combine the recorded video of the environment with the geographic location information from the location database, and the combined geographic location information and the video of the environment comprises an augmented reality video of the environment.

In a further embodiment of the system, the environmental condition detected by the environmental sensor indicates a light level in the environment below a threshold.

In yet another embodiment of the system, the environmental condition detected by the environmental sensor indicates a presence of moisture in the environment above a threshold.

In yet a further embodiment of the system, the processor is further operative to receive a location of a mobile device detected by a global positioning receiver, and retrieve the geographic location information from the location database based on the detected location of the mobile device.

In another embodiment of the system, the geographic location information comprises a computer-generated outline of the environment.

A method for representing an environment is also provided. In one embodiment, the method comprises receiving, from an environmental input device, environmental information of an environment, receiving, from an environmental sensor, an environmental condition, retrieving, from a memory, geographic location information about the environment stored in a location database, retrieving, with a processor, an environmental action from an environmental condition database based on the environmental condition, and combining the geographic location information from the location database with the environmental information from the environmental input device.

In another embodiment of the method, the method further comprises receiving, from the environmental input device, a recorded video of the environment to include in the environmental information.

In a further embodiment of the method, the method further comprises combining the video of the environment recorded by the environmental input device with the geographic location information from the location database.

In yet another embodiment of the method, the method further comprises receiving, from an internal microphone, a first sound, receiving, from an external microphone, a second sound, detecting a sound level of the first sound and a sound level of the second sound, and adjusting the sound level of the first sound based on the first and second sound levels.

In yet a further embodiment of the method, the method further comprises adjusting the sound level of the second sound based on the level of sound detected by the environment sensor to obtain a third sound comprising the second sound having the adjusted sound level, combining the first sound recorded by the internal microphone with the third sound obtained by the processor, and transmitting the combined first sound and third sound.

In another embodiment of the method, the environmental information comprises a video of the environment and the method further comprises combining the video of the recorded environment with the geographic location information from the location database and transmitting an augmented reality video of the environment that comprises the combined video of the recorded environment and the geographic location information from the location database.

In a further embodiment of the method, the detected environmental condition indicates a light level in the environment below a threshold.

In yet another embodiment of the method, the detected environmental condition indicates a presence of moisture in the environment above a threshold.

In yet a further embodiment of the method, the method further comprises receiving a detected location of a mobile device in the environment and retrieving, with the processor, the geographic location information from the location database based on the detected location of the mobile device.

In another embodiment of the method, the geographic location information comprises a computer-generated outline of the environment.

DETAILED DESCRIPTION

Figure 1:
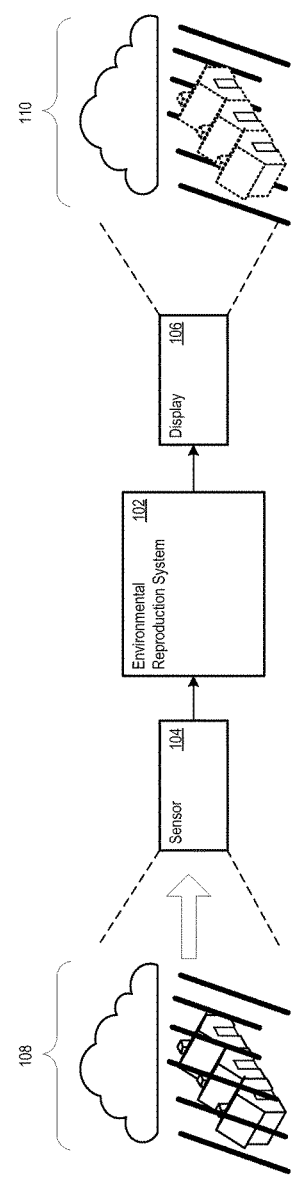
FIG. 1 illustrates an example of an environmental reproduction system reproducing an environment in accordance with aspects of the invention.

To reduce the impediments to sight and/or sound, an environmental reproduction system may be operative to reconstruct an image or integrate a sound. FIG. 1 shows one example of an environmental reproduction system 102 for reproducing an environment 108 having one or more visual or audible impediments. The environmental reproduction system 102 may be in communication with one or more sensors 104 and a display 106. In addition, the environmental reproduction system 102 may be in communication with additional input devices and/or output devices, such as audio speakers or a video camera (not shown). In a first embodiment, the sensor 104 may record measurements relating to the environment, such as temperature measurements, humidity measurements, light measurements, or any other environmental measurement. As discussed below, the sensor 104 may be a stand-alone sensor or may be incorporated into a mobile device. In a second embodiment, the sensor 104 may record a video or a series of images, such as a series of images recorded at predetermined time intervals, and then transmit the recorded video and/or series of images to the environmental reproduction system 102.

The measurements recorded by the sensor 104 may be for an environment 108 having inclement weather (such as rain), low light levels (such as at nighttime), obstructed views (as in dense urban areas), high light levels (such as snow or sand reflecting light), or other such environmental conditions. The measurements may also include audio levels for music playing on a radio station. For instance, the sensor 104 may be a microphone in a vehicle. The sensor 104 may also be mounted on the exterior of the vehicle or may have access to sounds outside the vehicle.

The environmental measurements may be communicated to the environmental reproduction system 102 via a network, such as a wired network, wireless network, or a combination thereof. For example, the environmental reproduction system 102 may be a remote server in communication with a mobile device to which the environmental sensor 104 is mounted. Alternatively, the environmental reproduction system 102 may be internal to a mobile device and the sensor 104 may be a component of the mobile device or may be in communication with the mobile device, such as by using a wired technology, like a Universal Serial Bus ("USB") connection, or a wireless technology, such as Bluetooth. In yet another embodiment, the environmental reproduction system 102 may be a mobile device, such as a smartphone, laptop, notebook computer, or any other mobile device.

The environmental measurements recorded by the sensor 104 may be used by the environmental reproduction system 102 to reproduce an environment 110 without the impediments to sight and/or sound. As discussed below with reference to FIG. 2, the environmental reproduction system 102 may use the recorded environmental measurements to determine a multiplexing action to apply to a recording of the environment 108 and reproduce a digital version of the environment 110. For example, where the environmental measurements indicate darkness, the environmental reproduction system 102 may apply light enhancing techniques to increase the brightness of the recording of the environment 108 to reproduce a brightened version of the environment. As shown in FIG. 1, where the recorded measurements indicate rainfall or other weather impediments (snow, fog, sleet, etc.), the environmental reproduction system 102 may apply digital filtering techniques to remove the weather impediments to produce the digital version of the environment 110. In yet another embodiment, the electronic reproduction system 102 may retrieve a digitally stored version of the environment 108, such as a recording of the environment 104 prior to the weather impediments, and reproduce the environment 108 based on the prior recording.

In yet another embodiment, the environmental reproduction system 102 may provide an interpreted alert to the user based on the environmental measurements. For example, where the sensor 104 detects or receives notification of a traffic accident (such as where the sensor 104 is a traffic receiver), the environmental reproduction system 102 may communicate an alert to the user of the traffic accident. The alert communicated to the user may be an auditory alert, such as a single tone alert, a visual tone, such as a blinking or illuminated light, or a combination of visual and auditory alerts. The environmental reproduction system 102 may reproduce alerts or notifications for other environmental measurements as well, such as light measurements, moisture measurements, sound measurements, or any other type of environmental measurement.

Moreover, the environmental reproduction system may use a recording of the environment 108 with the weather impediments and manipulate the recording to display environmental information obscured by the weather impediments. For instance, the environmental reproduction system 102 may retrieve street address information for houses obscured by the weather impediments and overlay the address information in a digitally reproduced version of the environment 110. In yet a further embodiment, outlines of buildings obscured by the weather impediments may be reproduced in the digital version of the environment 110 based on a prior recording of the environment 108 (such as street-level images and the like).

The digitally reproduced environment 110 may be shown on a display 106 in communication with the environmental reproduction system 102. The display 106 may be a stand-alone display, such as a computer monitor, or may be integrated into a mobile device, such as a laptop, smartphone, or other mobile device. The display 106 may show an image of the reproduced environment 110 with digital overlays, outlines of buildings that have been obscured by the weather impediments, or other graphical enhancements to improve the display of the reproduced environment 110. Moreover, the reproduction of the digital environment 110 may include playing one or more sounds through a speaker (not shown) in communication with the environmental reproduction system 102, such as in instances where emergency vehicles are present in the environment and the sounds of the emergency vehicles are being impeded by competing sounds (loud music, construction noises, etc.) In this manner, the environmental reproduction system 102 functions to reproduce the environment 104 substantially free of impediments, both visual and/or auditory, that would reduce a person's viewing of the environment 104 or impair person's ability to hear one or more sounds in the environment 104.

Figure 2:
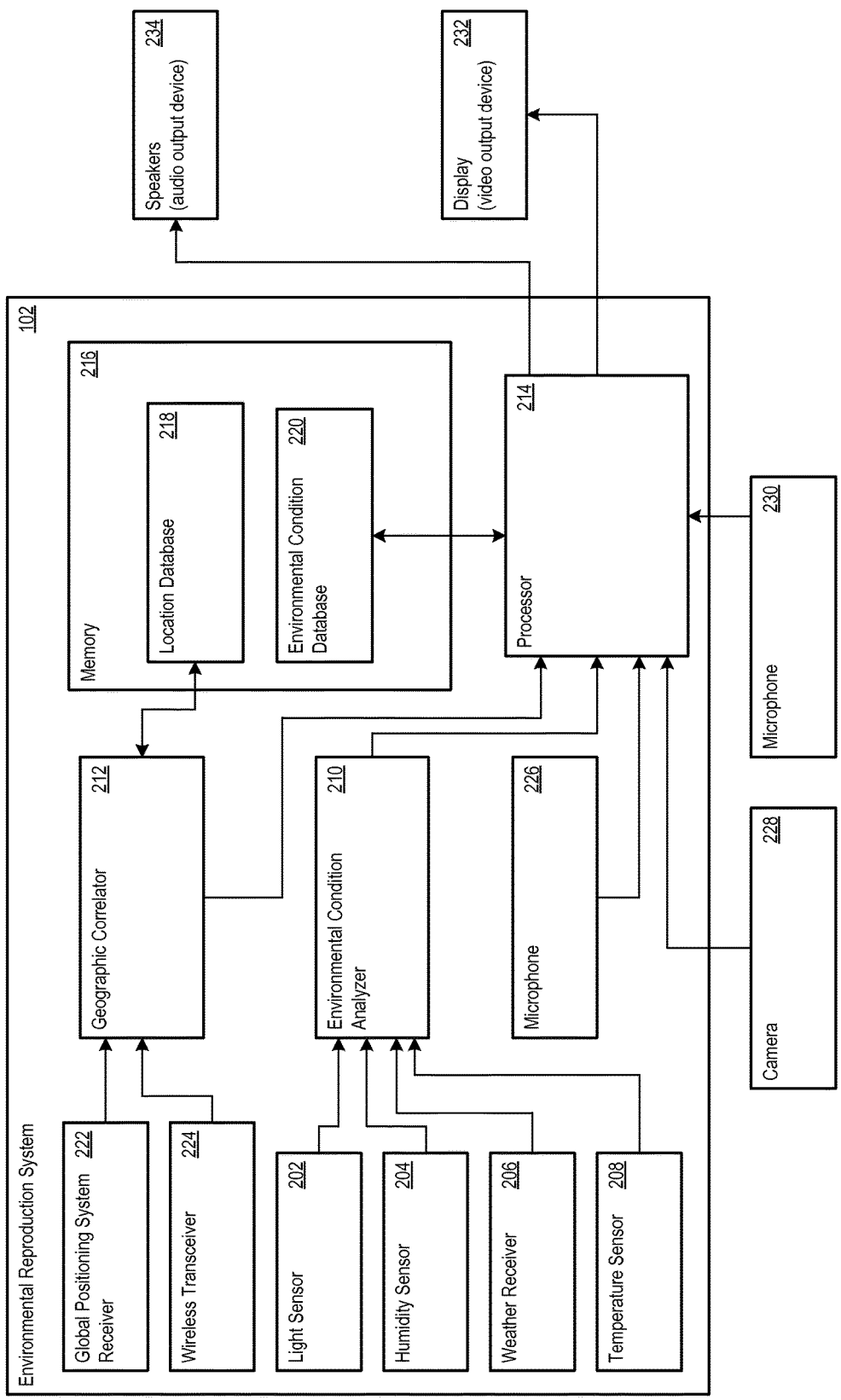
FIG. 2 illustrates an example of an environmental reproduction system in accordance with aspects of the invention.

FIG. 2 shows one example of the environmental reproduction system 102 used to remove the sight and/or sound impediments for an environment. The environmental reproduction system 102 may include various sensors for recording and/or one or more environmental measurements. The sensors may include a light sensor 202, a humidity sensor 204, a weather receiver 206, and/or a temperature sensor 208. It should be understood that the sensors 202-208 shown in FIG. 2 are not meant to be exhaustive and that the sensors 202-208 may be any type of sensor operative to provide an environmental measurement. For example, while not shown, the sensors 202-208 may include a pressure sensor operative to detect footsteps and to provide the detection of the footsteps to the environmental reproduction system 102.

The weather receiver 206 may be any type of weather receiver, such as a weather receiver implemented in software, a weather receiver implemented in hardware, or combinations thereof. The weather receiver 206 may be a weather radio receiver operative to receive broadcasts from the National Weather Service. It should be appreciated that the environmental reproduction system 102 may include any combination of the sensors 202-208. The light sensor 202 may be operative to detect light conditions, such as the brightness or darkness of the target environment. The humidity sensor 204 may be operative to detect the humidity of the target environment. The weather receiver 206 may be operative to receive weather information regarding the target environment, such as whether the target environment is hot, cold, rainy, snowy, etc from a weather service, such as from the National Oceanic and Atmospheric Administration. The temperature sensor 208 may be operative to determine the temperature of the target environment.

Although FIG. 2 shows the sensors 202-208 contained within the environmental reproduction system 102, it should be understood that the sensors 202-208 may be in a different location than the environmental reproduction system 102. For example, one or more of the sensors 202-208 may be located in New York City and the environmental reproduction system 102 may be located in California. Moreover, one or more of the sensors 202-208 may be independently operating, such as a traffic-light mounted camera, a stand-alone temperature sensor, an outdoor light sensor, or the like. As another example, one or more of the sensors 202-208 may be part of a mobile device in communication within the environmental reproduction system 102. Moreover, the environmental reproduction system 102 may communicate the reproduced environment 110 to a mobile device located in a location different than the environmental reproduction system 102. Hence, each of the sensors 202-208, the environmental reproduction system 102, and one or more mobile devices in communication with the environmental reproduction system 102 may be located in various locations.

The sensors 202-208 may communicate one or more environmental measurements to an environmental condition analyzer 210. In one embodiment, the environmental condition analyzer 210 may be operated by the processor 214. The environmental condition analyzer 210 may be operative to determine an environmental condition from one or more of the environmental measurements from the sensors 202-208. For example, the environmental condition analyzer 210 may determine that the target environment is "dark" based on the amount of light or darkness measured by the light sensor 202. The environmental condition analyzer 210 may alternatively determine that the target environment is "humid" based on the humidity measurements recorded by the humidity sensor 204. The environmental condition analyzer 210 may communicate the determined environmental condition to the processor 214.

The environmental reproduction system 102 may also include a global positioning system ("GPS") receiver 222 and a wireless transceiver 224. The GPS receiver 222 and the wireless transceiver 224 may be operative to record environmental information about the target environment, such as the location of the user in the target environment. The location of the user may be determined as a set of longitude and latitude coordinates, as a street address, or as any other type of location. The wireless transceiver 224 may also be used to identify the location of the user, such as through WiFi triangulation, cellular triangulation, reverse-DNS lookups, IP address geolocation, or any other method for determining the geographic location of the user.

The environmental information detected by the GPS receiver 222 and/or the wireless transceiver 224 is communicated to a geographic correlator 212 (which, like the environmental condition analyzer 210, may be managed by the processor 214). The geographic correlator 212 may be operative to identify corresponding street-level images of the location of the user based on the environmental information provided by the GPS receiver 222 and/or the wireless transceiver 224. For example, in one embodiment, the environmental reproduction system includes a memory 216 having a location database 218 and an environmental condition database 220. The location database 218 may be operative to store geographic location information about the target environment. The geographic location information about the target environment may include previously recorded video, one or more street-level images, or any other kind of graphical information about the target environment. In addition, the location database 218 may be operative to store address information for one or more buildings of the target environment. Although FIG. 2 illustrates that the location database 218 may be local to the environmental reproduction system 102, the location database 218 may reside on a remote server or on a distributed network to reduce memory overhead and data storage requirements for the environmental reproduction system 102. The location database 218 may be periodically updated with street-level images of the target environment or other geographic location information. For example, the location database 218 may be updated with street-level images of the target environment when one or more sensors, such as the GPS receiver 222 and/or the wireless transceiver 224, indicate that the user of the environmental reproduction system 102 is on or near the target environment.

The environmental reproduction system 102 may also include additional sensors, such as audio and video sensors. In one embodiment, the environmental reproduction system 102 may include an internal microphone 226, an external microphone 230, and a camera 228. The internal microphone 226 may be similar to a microphone found on a mobile device and operative to record and/or monitor sounds near the user. For example, the internal microphone 226 may monitor and/or record sounds in a vehicle, such as the music playing on the radio of the vehicle. The external microphone 230 may be operative to monitor and/or record sounds external to the environmental reproduction system 102. For example, the external microphone 230 may be an external microphone operative to record and/or monitor the sounds outside of a vehicle. Both the internal microphone 226 and the external microphone 230 may be further equipped with a sound level meter, and both the sounds and the sound levels may be communicated to the processor 214.

The camera 228 may be operative to record videos of the environment to be reproduced (i.e., the target environment). For example, the camera 228 may be a camera found on a smartphone or other mobile device and operative to record a video of the target environment. The camera 228 may alternatively record still images of the target environment. For example, the camera 228 may be a traffic light-mounted camera for recording intermittent images of vehicles passing underneath or by the traffic light. The images and/or video recorded by the camera 228 may be communicated to the processor 214.

The processor 214 may then perform one or more signal processing actions on the recorded video and/or images of the target environment. The signal processing actions may include displaying an augmented reality of the target environment on display 232, overlaying one or more graphics on the video of the target environment, brightening the video of the target environment, incorporating exterior sound with interior sound, adjusting the sound level for the interior sound monitored by the interior microphone 226, or any other kind of signal processing action, including multiplexing.

The augmented reality of the target environment may include video or images of the target environment overlaid with previously recorded images of the target environment from the location database 218. An augmented reality display of the target environment may also include graphical labels overlaid on the video target environment. The graphical labels may provide address information about one or more buildings in the target environment and may be retrieved from the location database 218. In yet another embodiment, outlines of the buildings of the target environment may be displayed on the display 232 such that the outlines are visible through the visual impediments of the target environment (e.g., rain, snow, darkness, etc.)

In one embodiment, the processor 214 is operative to automatically select a signal processing action from the environmental condition database 220 based on the environmental condition determined by the environmental condition analyzer 210. For example, where the environmental condition analyzer 210 determines that the target environment is dark (i.e., has low light levels detected by the light sensor 202), the processor 214 may select an action from the environmental database 220 that corresponds to a dark target environment. As another example, where the environmental condition analyzer 210 determines that an emergency sound should be heard in the interior of a vehicle, such as where the exterior microphone 230 detects a proximate emergency sound, the processor 214 may select an action corresponding to a detected emergency sound, where the action integrates or multiplexes the interior sound with the exterior sound. The combined sound may be output by the environmental reproduction system 102 through one or more speakers 234 in communication with the environmental reproduction system 102. The speakers 234 may be speakers on a mobile device, such as a smartphone, speakers on a vehicle and in wireless communication with the environmental reproduction system 102, or any other type of speaker. Alternatively, a signal processing action for sound may include adjusting an interior sound level to be different (such as lower in the case of emergency vehicles or higher in the case of construction noises) than an exterior sound level. A signal processing action for sound may further include using noise cancellation techniques to reduce or cancel out the exterior sound, such as in the case where the interior sound is music and the exterior sound is construction noises or other loud sounds.

In an alternative example, a user may select an action to apply to the video of the target environment or to the local sound of the environmental reproduction system 102. For example, when the environmental condition is determined by the environmental condition analyzer 210, the environmental reproduction system 102 may prompt the user to select an action to apply. The user may provide the selected action to apply through an input device in communication with the environmental reproduction system 102, such as a keyboard, mouse, touchscreen, or other input device.

Figure 3:
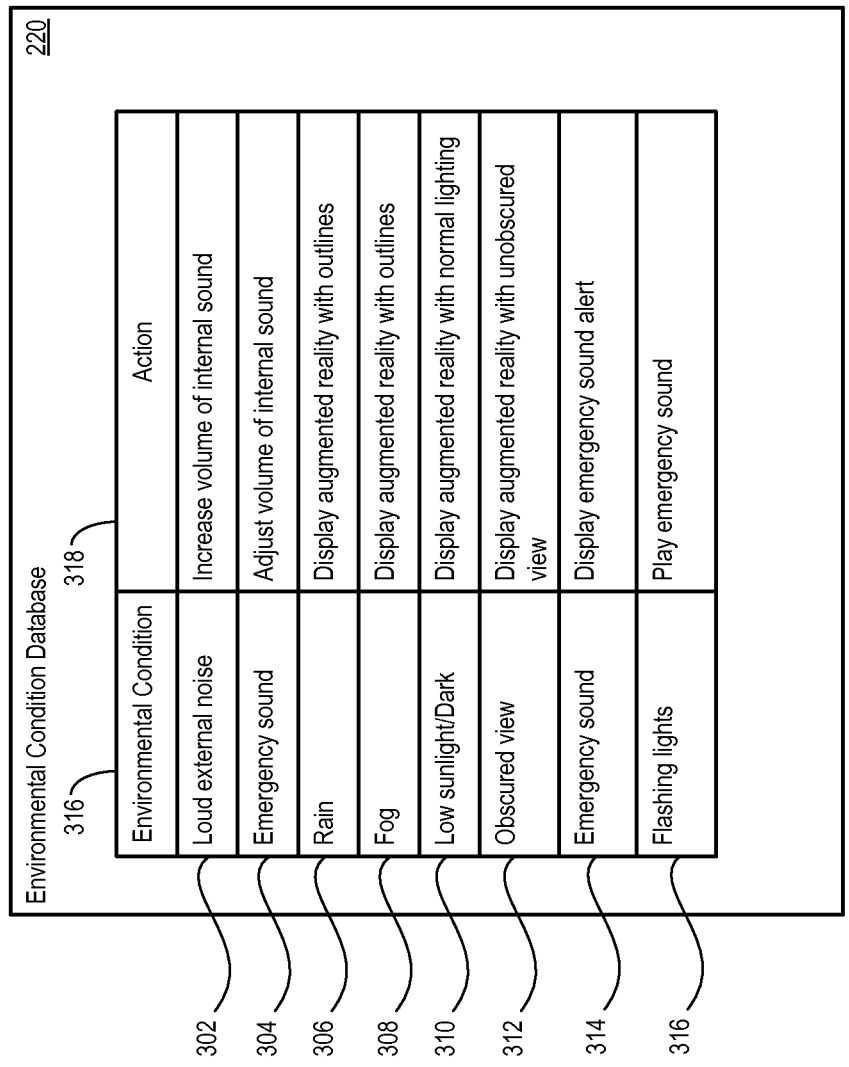
FIG. 3 illustrates an example of an environmental condition database used in the environmental reproduction system in accordance with aspects of the invention.

FIG. 3 illustrates one example of the environmental condition database 220. The environmental condition database 220 may be a database local to the environmental reproduction system 102 or it may be stored on one or more servers and distributed across a network in communication with the environmental reproduction system 102. The environmental condition database 220 may include one or more environmental condition records 302-316. An environmental condition record, such as the environmental condition record 302, may correlate an environmental condition 316 and a corresponding action 318. As shown in FIG. 3, the environmental condition 316 for a loud external noise may include increasing the volume of an internal sound, such as a music playing on a radio in communication with the environmental reproduction system 102. As another example, the environmental condition 316 for rain may include displaying an augmented reality of the target environment that includes outlines of buildings overlaid on the video of the target environment. As discussed previously, images and/or outlines of the buildings in the target environment may be retrieved from the location database 218.

Moreover, the action 318 may involve providing an interpreted notification to the user regarding the environmental condition 316. For example, one environmental record 314 may correlate an emergency sound condition with the display of an emergency sound alert. The display of the emergency sound alert may be the display of a text message, a warning light, or other type of visual alert. As another example, another environmental record 316 may correlate a flashing lights environmental condition with the playback of an emergency sound. The playback of the emergency sound may be a monotone sound, polyphonic sound, or any other type of sound. In the examples of the environmental records 314-316, the environmental reproduction system 102 may refer to a user set of preferences to determine which action 316 to take. For example, the environmental record 314 and the environmental record 304 correlate similar environmental conditions 316 (i.e., an emergency sound). In this example, the environmental reproduction system 102 may refer to a user set of preferences that indicates that the user prefers to receive visual displays of the emergency sound rather than adjusting the volume of the internal sound. In alternative embodiments, and discussed previously, the user may select which action 318 to apply to an environmental condition. In this manner, the environmental reproduction system 102 may transform an environmental condition into an interpreted result for the user.

With reference to FIG. 2, while the processor 214 may apply a signal processing action automatically, the processor 214 may present the action 318 as an option to a user of the environmental reproduction system 102. For example, when the environmental condition 316 of fog is determined, the processor 214 may prompt the user whether the user wants the environmental reproduction system 102 to display an augmented reality of the target environment with outlines of buildings. The processor 214 may further select one or more actions 318 depending on the determined number of environmental conditions. For example, the environmental reproduction system 102 may determine the target environment is experiencing rain and darkness. In this example, the processor 214 may apply (or offer) the actions 318 of displaying an augmented reality of the target environment with outlines and with adjusted lighting (such as by increasing the brightness of the video and/or images of the target environment). Although shown with environmental records 302-316, it should be understood that the environmental condition database 220 may include other environmental condition records (such as records for a bright environmental condition, a snowy environmental condition, a low level external noise environmental condition, or any other type of environmental condition). Through the environmental condition database 220, the processor 214 may intelligently determine how to overcome impediments to sight and/or sound present in the target environment.

Figure 4:
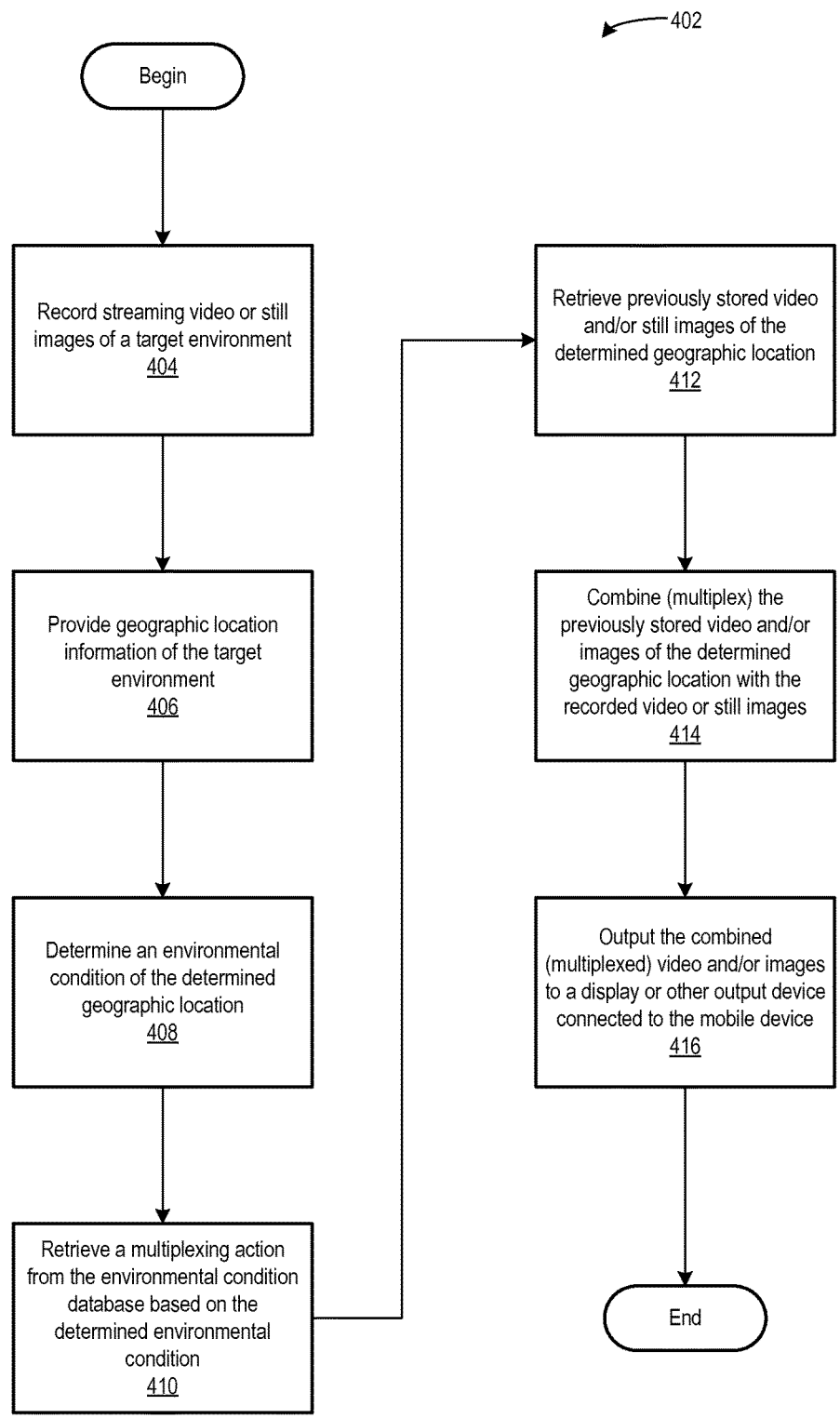
FIG. 4 illustrates one example of logic flow for applying a multiplexing action to video or interval images of a target environment by the exemplary environmental reproduction system in accordance with aspects of the invention.

FIG. 4 illustrates one example of logic flow 402 for applying an action to video or interval images of a target environment by the exemplary environmental reproduction system 102. Initially, the environmental reproduction system 102 records a video and/or interval images of a target environment (Block 404). In one embodiment, the environmental reproduction system 102 may determine which type of recording to capture (video or still images) depending on one or more performance variables, such as available network bandwidth, available processor cycles, available memory, image quality, camera megapixels, etc.

The environmental reproduction system 102 may then determine the geographic location of the target environment (Block 406). The geographic location of the target environment may be determined from receiving geographic location information (such as GPS coordinates) from one or more sensors. As discussed previously, one or more sensors of the environmental reproduction system 102 may be those of a mobile device, such as the GPS of a smartphone. Alternatively, the environmental reproduction system 102 may be implemented on a remote server and a mobile device may provide the geographic location of the target environment through a network to the environmental reproduction system 102. As discussed above with regard to FIG. 2, the sensors 202-208, the environmental reproduction system 102, and a mobile device operative to receive results from the environmental reproduction system 102 may each be in separate locations and in communication using one or more networks.

The environmental reproduction system 102 may then next detect and/or determine one or more environmental conditions of the determined geographic location (Block 408). In one embodiment, the environmental reproduction system 102 is in the target environment and in communication with one or more sensors, such as the sensors 202-208, to determine the environmental condition of the target environment. In another embodiment, the environmental reproduction system 102 is a remote server and a mobile device communicates the environmental measurements to the environmental reproduction system 102 through a network. In yet another embodiment, the sensors 202-208 communicate with the environmental reproduction system 102 without an intervening mobile device (e.g., a sensor may be a traffic-light mounted camera, an outdoor temperature sensor, or the like). Based on the environmental measurements, the environmental reproduction system 102 may then determine one or more environmental conditions of the target environment.

Based on the determined environmental conditions, the environmental reproduction system 102 may then determine which multiplexing actions to apply to the recording of the target environment (Block 410). As discussed previously, the application of the multiplexing action to the recording of the target environment may be automatic, the environmental reproduction system 102 may prompt a user to select a multiplexing action, or a combination thereof. The multiplexing action may be determined by retrieving one or more environmental condition records from the environmental condition database 220.

The environmental reproduction system 102 may then retrieve previously stored video and/or images of the target environment to combine (e.g., multiplex) with the currently recorded video and/or still images of the target environment (Block 412). In one embodiment, the environmental reproduction system 102 retrieves the previously recorded video and/or images from the location database 218. As discussed previously, the location database 218 may include previously captured street-level images of the target environment, previously recorded video of the target environment, address or business information for one or more buildings in the target environment, or any other type of geographic location information.

Depending on the selected action, the environmental reproduction system 102 may then combine (e.g., multiplex) the previously stored video and/or images of the target environment with the currently recorded video and/or interval images of the target environment (Block 414). However, where the selected action is to increase the brightness of the recorded video of the target environment, the environmental reproduction system 102 may brighten the recorded video of the target environment. Similarly, depending on the selected action, the environmental reproduction system 102 may overlay outlines of the buildings in the target environment on the recorded video of the target environment or overlay address information for one or more buildings in the target environment on the recorded video of the target environment. The recorded video and/or still images of the target environment with the applied action may then be output on an output device, such as the display 232 in communication with the environmental reproduction system 102 (Block 416). As discussed previously, the display 232 may be the display on a mobile device. In an alternative embodiment, the display 232 may be the display in a dashboard-mounted display of a vehicle. In this embodiment, the vehicle may be equipped with a wireless transceiver (cellular or otherwise) and may be operative to receive video and/or images from the environmental reproduction system 102, which then may be displayed on the dashboard-mounted display. Accordingly, it should be understood that the environmental reproduction system 102 may transmit video and/or images to any device in communication with the environmental reproduction system 102, regardless of whether the device is a mobile device, vehicle, or desktop device.

Figure 5:
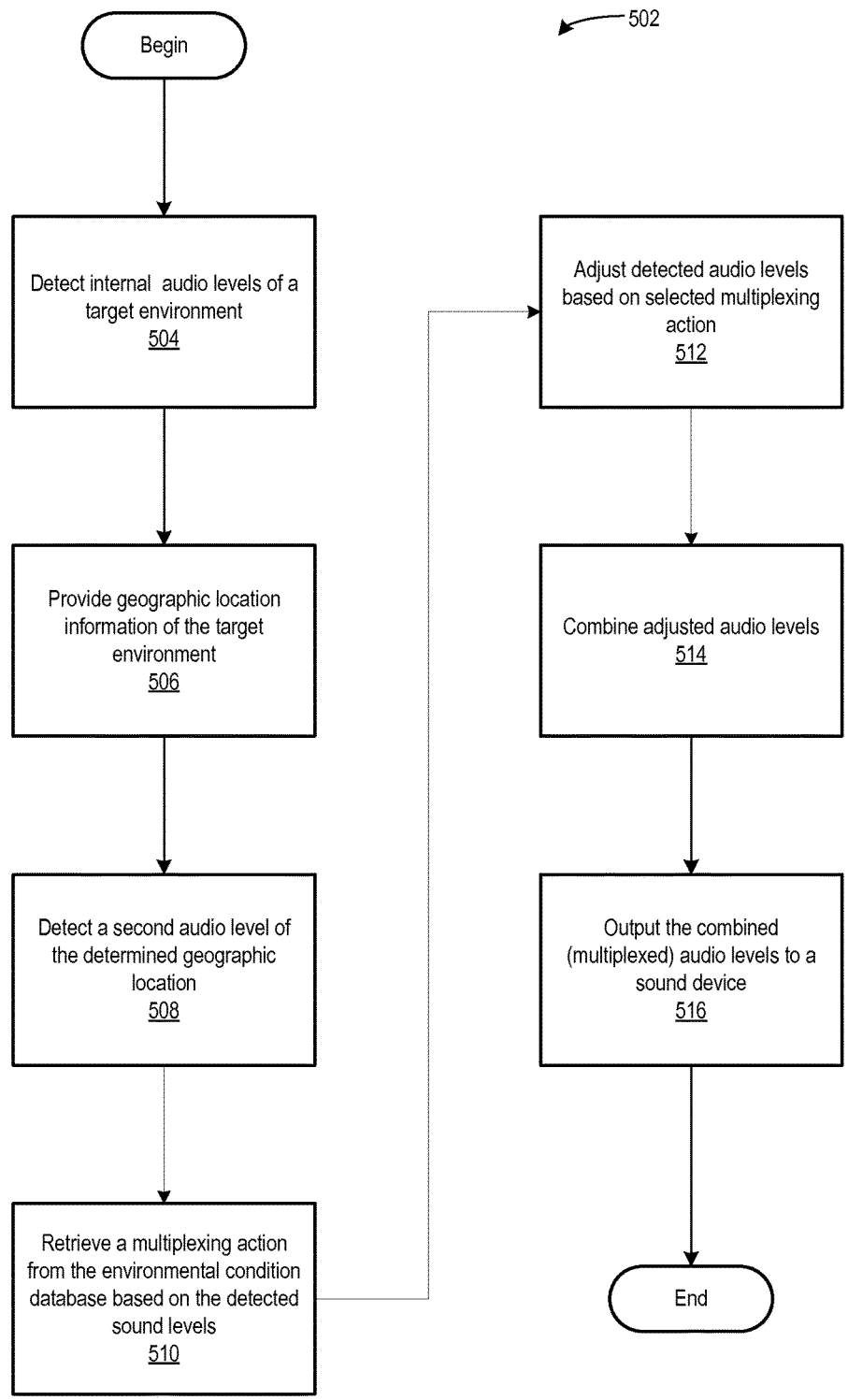
FIG. 5 illustrates one example of logic flow for applying a multiplexing action to audio by the exemplary environmental reproduction system in accordance with aspects of the invention.

FIG. 5 illustrates logic flow 502 for applying an action to audio by the exemplary environmental reproduction system 102. Initially, the environmental reproduction system 102 may detect audio levels of sound of a target environment, such as by detecting the audio levels of an environment using the internal microphone 226, which may be a microphone found on a mobile device, such as a smartphone, laptop, notebook computer, or other mobile device (Block 504).

The environmental reproduction system 102 may then determine the geographic location of the target environment (Block 506). The geographic location of the target environment may be determined by receiving geographic location information (such as GPS coordinates) from one or more sensors. As discussed previously, one or more sensors of the environmental reproduction system 102 may be those of a mobile device, such as the GPS receiver of a smartphone. Alternatively, the environmental reproduction system 102 may be implemented on a remote server and a mobile device may provide the geographic location of the target environment through a network to the environmental reproduction system 102.

The environmental reproduction system 102 may then detect a second sound level, such as an exterior or outdoor sound using the external microphone 230 (Block 508). The exterior or outdoor sound may be construction noises, emergency vehicle sirens, music concert noises, roadway noise, or any other type of outdoor sound.

Based on the detected sound levels, the environmental reproduction system 102 retrieves an action from the environmental condition database 220 (Block 510). The selection of the action may be based on an increase in the sound level of the detected exterior or outdoor sound or on the type of detected exterior or outdoor sound. For example, where the detected exterior or outdoor sound is construction noise, the selected action may include increasing the sound level of the interior sound, such as where the user is listening to music and outdoor construction noise is impeding the user's enjoyment of the music. As another example, where the detected exterior or outdoor sound is an emergency vehicle sirens, the selected action may include decreasing the audio level of the interior sound and/or increasing the audio level of the emergency vehicle siren. In yet another example, the action may include combining the interior sound with the exterior sound or indicating the direction of the exterior sound, such as by detecting the origin of the emergency vehicle siren, and increasing the volume of the emergency vehicle siren on speakers corresponding to the direction of travel of the emergency vehicle. In yet a further example, the action may include applying noise cancellation techniques to the exterior sound such that the exterior sound is reduced or diminished.

The environmental reproduction system 102 may then adjust one or more sound levels based on the retrieved action (Block 512). As mentioned above, adjusting the detected sound levels may include increasing the sound levels or decreasing the sound levels, and, more particularly, increasing or decreasing the sound levels in one or more speakers in communication with the environmental reproduction system 102. The environmental reproduction system 102 may then combine the adjusted sound levels to reproduce a third sound from the speakers 234, such as where the interior sound is music and the exterior sound is an emergency vehicle siren and the user indicates a preference not to stop the playback of the music (Block 514).

In an alternative embodiment, the environmental reproduction system 102 may selectively determine when to combine the audio of the interior sound with the audio of the exterior sound based on the type of detected sound. For example, where the environmental reproduction system 102 determines that the exterior sound is construction noise and that the interior sound is music, the environmental reproduction system 102 may selectively determine not to combine the two sounds and that the ability to hear the interior sound is preferable.

After deciding whether to combine the interior sound with the exterior sound, the environmental reproduction system outputs the sounds on an output device, such as the speakers 234. The speakers 234 may be headphones on a smartphone, the internal speaker of a smartphone, speakers on a vehicle, or any other type of speaker in communication with the environmental reproduction system 102. Moreover, the audio output by the environmental reproduction system 102 may be output on more than one speaker, such as by being output on both a vehicle speaker and a set of headphones.

In this manner, the environmental reproduction system 102 facilitates the removal of impediments of sight and sound in target environments. Through the use of the environmental reproduction system 102, a user is able to see a target environment or hear sounds in the target environment better. As mentioned previously, the environmental reproduction system 102 is not limited to only reproducing an augmented reality for one sense, but may be used in creating an optimal representation of a target environment by blending multiple multi-modal sources. Depending on the circumstances or on the environmental conditions of the target environment, the multi-modal sources may be real-time (active microphones and cameras), pre-recorded (previously captured video, audio, or photographs), or a combination thereof. Moreover, the sources may be on a mobile device, such as mobile device camera, or external, such as a traffic light-mounted camera.

The systems, components, and logic described above may be implemented in many different ways, including a combination of various hardware components. The functionality of the environmental reproduction system 102 may be implemented in a single system or functionally partitioned across multiple systems. In addition, data structures in the memory 216 may be stored on, distributed across, or read from many different types of memory. The memory may include random access memory ("RAM"), read-only memory ("ROM"), hard disks, floppy disks, CD-ROMs, flash memory or other combinations of memory.

The geographic correlator 212 and the environmental condition analyzer 210 may be implemented in a computer programming language, such as C# or Java, or any other computer programming language now known or later developed. Moreover, the geographic correlator 212 and/or the environmental condition analyzer 210 may be implemented as dedicated hardware and in communication with the processor 214 through buses or other communication channels.

Furthermore, the environmental reproduction system 102 may be implemented with additional, different, or fewer components. As one example, the processor 214 may be implemented with a microprocessor, a microcontroller, a DSP, an application specific integrated circuit (ASIC), discrete analog or digital logic, or a combination of other types of circuits or logic. The environmental reproduction system 102 may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Interfaces between the environmental reproduction system 102 and other components, such as the various sensors, transceivers, and cameras, may be implemented in numerous ways. For example, the interfaces may include hardware interfaces, such as Universal Serial Bus ("USB") or other types of hardware interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

We claim:

1. A computer-implemented method comprising:
   receiving a first image of an object;
   determining a geographic location associated with the first image or the object;
   determining to enhance an appearance of the object in the first image;
   in response to determining to enhance the appearance of the object in the first image, identifying a second image based at least on the geographic location;
   generating an enhanced image of the object based at least on the first image and the second image, wherein generating an enhanced image of the object based at least on the first image and the second image comprises combining the first image and the second image by overlaying a portion of the second image that includes at least a portion of the object over a portion of the first image that includes at least a portion of the object, and wherein the enhanced image overcomes at least one impediment to viewing the object; and
   providing the enhanced image for display.

2. The method of claim 1, wherein determining a geographic location associated with the first image or the object comprises:
   obtaining geographic coordinates indicating where the first image of the object was taken.

3. The method of claim 1, wherein determining to enhance an appearance of the object in the first image comprises:
   identifying the object in the first image; and
   in response to identifying the object in the first image, determining to enhance the appearance of the object in the first image.

4. The method of claim 1, wherein determining to enhance an appearance of the object in the first image comprises:
   determining that the object is likely to be obscured in the first image; and
   in response to determining that the object is likely to be obscured in the first image, determining to enhance the appearance of the object in the first image.

5. The method of claim 1, wherein in response to determining to enhance the appearance of the object in the first image, identifying a second image based at least on the geographic location, comprises:
   identifying the second image as an image stored in association with the geographic location.

6. A system comprising:
   one or more computers and one or more storage devices storing instructions that are operable, when executed by the one or more computers, to cause the one or more computers to perform operations comprising:
   receiving a first image of an object;
   determining a geographic location associated with the first image or the object;
   determining to enhance an appearance of the object in the first image;
   in response to determining to enhance the appearance of the object in the first image, identifying a second image based at least on the geographic location;
   generating an enhanced image of the object based at least on the first image and the second image wherein generating an enhanced image of the object based at least on the first image and the second image comprises combining the first image and the second image by overlaying a portion of the second image that includes at least a portion of the object over a portion of the first image that includes at least a portion of the object, and wherein the enhanced image overcomes at least one impediment to viewing the object; and
   providing the enhanced image for display.

7. The system of claim 6, wherein determining a geographic location associated with the first image or the object comprises:
   obtaining geographic coordinates indicating where the first image of the object was taken.

8. The system of claim 6, wherein determining to enhance an appearance of the object in the first image comprises:
   identifying the object in the first image; and
   in response to identifying the object in the first image, determining to enhance the appearance of the object in the first image.

9. The system of claim 6, wherein determining to enhance an appearance of the object in the first image comprises:

determining that the object is likely to be obscured in the first image; and in response to determining that the object is likely to be obscured in the first image, determining to enhance the appearance of the object in the first image.

10. The system of claim 6, wherein in response to determining to enhance the appearance of the object in the first image, identifying a second image based at least on the geographic location, comprises:

identifying the second image as an image stored in association with the geographic location.

11. A non-transitory computer-readable medium storing software comprising instructions executable by one or more computers which, upon such execution, cause the one or more computers to perform operations comprising:

receiving a first image of an object;

determining a geographic location associated with the first image or the object;

determining to enhance an appearance of the object in the first image;

in response to determining to enhance the appearance of the object in the first image, identifying a second image based at least on the geographic location;

generating an enhanced image of the object based at least on the first image and the second image wherein generating an enhanced image of the object based at least on the first image and the second image comprises combining the first image and the second image by overlaying a portion of the second image that includes at least a portion of the object over a portion of the first image that includes at least a portion of the object, and wherein the enhanced image overcomes at least one impediment to viewing the object; and providing the enhanced image for display.

12. The medium of claim 11, wherein determining a geographic location associated with the first image or the object comprises:

obtaining geographic coordinates indicating where the first image of the object was taken.

13. The medium of claim 11, wherein determining to enhance an appearance of the object in the first image comprises:

identifying the object in the first image; and in response to identifying the object in the first image, determining to enhance the appearance of the object in the first image.

14. The medium of claim 11, wherein determining to enhance an appearance of the object in the first image comprises:

determining that the object is likely to be obscured in the first image; and in response to determining that the object is likely to be obscured in the first image, determining to enhance the appearance of the object in the first image.

15. The medium of claim 11, wherein in response to determining to enhance the appearance of the object in the first image, identifying a second image based at least on the geographic location, comprises:

identifying the second image as an image stored in association with the geographic location.

16. A computer-implemented method comprising:

receiving a first image of an object;

determining a geographic location associated with the object;

determining to enhance an appearance of the object in the first image;

in response to determining to enhance the appearance of the object in the first image, identifying the same object in a second image based at least on the geographic location;

generating an enhanced image of the object based at least on the first image and the second image so as to display environmental information, wherein the environmental information was obscured by at least one impediment prior to enhancing the image, and wherein the enhanced image overcomes the at least one impediment to viewing the object; and providing the enhanced image for display.

* * * * *